United States Patent [19]

Moczygemba

[11] 4,168,286

[45] Sep. 18, 1979

[54] TETRABLOCK POLYMERS AND THEIR HYDROGENATED ANALOGS

[75] Inventor: George A. Moczygemba, Bartlesville, Okla.

[73] Assignee: Phillips Petroleum Co., Bartlesville, Okla.

[21] Appl. No.: 835,932

[22] Filed: Sep. 23, 1977

[51] Int. Cl.$^2$ .......................................... C08F 297/04
[52] U.S. Cl. ..................................... 525/314; 525/289
[58] Field of Search ..................................... 260/880 B

[56] References Cited

U.S. PATENT DOCUMENTS

| T953,011 | 12/1976 | Smith ................................ 260/880 B |
| 3,670,054 | 6/1972 | DeLaMare ........................ 260/880 B |
| 3,853,978 | 12/1974 | Horiie .............................. 260/880 B |

FOREIGN PATENT DOCUMENTS 1130770  10/1968  United Kingdom ................. 260/880 B

*Primary Examiner*—Paul R. Michl

[57] ABSTRACT

Tetrablock polymers having the configuration $B-A_1-C-A_2$ and $C-A_1-B-A_2$ and their hydrogenated counterparts are disclosed, wherein B is a low vinyl poly 1,3-butadiene block, $A_1$ and $A_2$ can be the same or different polymerized blocks of a monovinylarene monomer having 8–14 carbon atoms per molecule, and C is a block selected from the group consisting of polymerized blocks of a conjugated diene having 4–12 carbon atoms per molecule in which there is on the average at least one side chain branch for every 10 carbon atoms of the polymeric backbone. The hydrogenated tetrablock polymers have the configuration $B'-A_1-C'-A_2$ and $C'-A_1-B'-A_2$ in which B' is hydrogenated B and C' is hydrogenated block C.

22 Claims, No Drawings

TETRABLOCK POLYMERS AND THEIR HYDROGENATED ANALOGS

BACKGROUND OF THE INVENTION

This invention relates to novel tetrablock polymers. In one of its more specific aspects, this invention relates to novel thermoplastic elastomers.

Various synthetic rubbers made from alkadiene monomers and from monovinylarenes are known in the art. Among these polymers are thermoplastic elastomers that are non-cured, hydrogenated polymers of the monomers just described.

The thermoplastic elastomers of this invention can be readily formed into useful articles which exhibit high green tensile strength at elevated temperatures and improved ozone resistance as compared to the unhydrogenated parent polymers. Furthermore, it would be desirable to have such thermoplastic elastomers available which have broad temperature ranges in which they soften and thus can be fabricated by various procedures.

It is thus one object of this invention to provide new polymers.

Another object of this invention is to provide new polymers of monovinylarenes and conjugated diene.

An additional object is to provide a hydrogenated elastomeric polymer having high green tensile strength.

Still a further object of this invention is to provide novel tetrablock polymers in which the olefinic unsaturation has been at least partially removed by hydrogenation, and which exhibit both thermoplastic and elastomeric properties after the hydrogenation.

Further objects, advantages, details and embodiments of this invention will become apparent to those skilled in the art from the following detailed description of the invention, the examples and the appended claims.

In accordance with this invention, it has been found that tetrablock polymers having the configuration $B—A_1—C—A_2$ and $C—A_1—B—A_2$, the meaning of $A_1$, $A_2$, $B_1$ and C being defined in the following, retain their thermoplastic elastomeric properties after hydrogenation. The hydrogenated tetrablock polymers have rubbery properties, and at the same time can be handled and shaped like their unhydrogenated parent polymer.

Thus, in accordance with one embodiment of this invention, there is provided novel tetrablock polymers having the general configuration

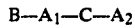    (i)

or

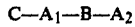    (ii)

wherein B is a block of low vinyl polybutadiene, $A_1$ and $A_2$ can be the same or different polymerized blocks of a monovinylarene monomer having 8–14 carbon atoms per molecule, C is a block selected from the group consisting of blocks of polymerized conjugated diene having 4–12 carbon atoms per molecule in which there is on the average at least one side chain branch for every 10 carbon atoms of the polymeric backbone.

In accordance with another embodiment of this invention, there are provided novel linear hydrogenated tetrablock polymers of the general configuration

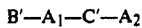    (iii)

or $C'—A_1—B'—A_2$    (iv)

wherein B' is a hydrogenated block of low vinyl polybutadiene, $A_1$ and $A_2$ can be the same or different polymerized blocks of a monovinylarene monomer having 8–14 carbon atoms per molecule, and C is a block selected from the group consisting of hydrogenated blocks of polymerized conjugated diene having 4–12 carbon atoms per molecule in which there is on the average at least one side chain branch for every 10 carbon atoms of the polymeric backbone.

The terms "hydrogenation" and "hydrogenated" refer to the fact that 10–100%, more preferably from 70 to 100%, of the total olefinic double bonds have been removed without removing substantial amounts of aromatic unsaturation.

The novel hydrogenated tetrablock polymers of this invention are thermoplastic elastomers. In particular the polymers of this embodiment have high green tensile strength and excellent resistance to ozone. The hydrogenated polymers thus obtained have rubbery properties but at the same time can be handled and molded as a typical thermoplastic polymer.

The following description of block B applies also to block B'. The block B is a polybutadiene having low vinyl content. It is important to this invention that this block is highly linear, i.e. contains as little branching as possible. It is well known in the art that during the polymerization of 1,3-butadiene to form block B, the formation of a small percentage of pendant vinyl groups is unavoidable. The term "low vinyl content," as used herein, refers to a vinyl content which ranges from 1 to about 10 mol percent of the total unsaturated polymerized 1,3-butadiene. In other words, the polymerization is preferably carried out so that a minimum of about 90 mol percent of 1,4-polymerization of the butadiene occurs and only up to about 10 percent of 1,2-polymerization of butadiene occurs.

The blocks $A_1$ and $A_2$ can be the same or different polymerized block of monovinylarene monomers having 8–14 carbon atoms.

Some examples of suitable monovinylarenes are styrene, α-methylstyrene, 3-methylstyrene, 4-n-propylstyrene, 1-vinylnaphthalene, 4-cyclohexylstyrene, and p-tolylstyrene.

Within one embodiment of this invention, styrene is the preferred monomer for formation of blocks $A_1$ and $A_2$.

The blocks C and C' in accordance with one embodiment of this invention, are polymerized blocks of a conjugated diene having 4–12 carbon atoms per molecule in which there is on the average at least one side chain branch for every 10 carbon atoms of the polymeric backbone.

Some examples of such suitable conjugated dienes are isoprene, 1,3-butadiene, 2,3-dimethyl-1,3-butadiene, piperylene, 3-butyl-1,3-octadiene, and 2-phenyl-1,3-butadiene.

From 1,3-butadiene, a polybutadiene having a vinyl content greater than 30 mol percent can be prepared. Polymerization of 1,3-butadiene can be carried out so that greater than 30 mol percent of 1,2 and/or 3,4 polymerization occurs, with the remaining percentages being 1,4 polymerization.

Thus, within one embodiment of this invention, a polybutadiene having a vinyl content greater than 30 mol percent is preferred for block C and block C'.

Within another embodiment of this invention, isoprene is the most preferred monomer for block C and block C'.

Thus, in accordance with the presently most preferred embodiment of this invention, the polymer of configuration (i) has the structure low vinyl polybutadiene-polystyrene-polyisoprene-polystyrene and, the polymer of configuration (ii) has the structure polyisoprene-polystyrene-low vinyl polybutadiene-polystyrene.

The monomer ratio in weight percent of the entire tetrablock polymer can be varied considerably. In the following table the generally employed and preferred ranges for the monomers in the four blocks are shown.

Table I

|  | $A_1$ | $A_2$ | B | C |
|---|---|---|---|---|
| Generally Employed Ranges (wt. %) | 5-60 | 5-60 | 5-60 | 5-80 |
| Preferred Ranges (wt. %) | 10-25 | 10-25 | 15-45 | 15-45 |

The weight average molecular weight of the tetrablock polymer of this invention can vary within a broad range. Typically, the weight average molecular weight will be in the range of about 25,000 to about 1,000,000. The preferred range is about 50,000 to about 200,000. Variances from the above ranges are within the scope of this invention. Such variances could be necessitated, for instance, by unusual utility requirements.

The non-hydrogenated polymers of this invention as defined above are useful compounds to be hydrogenated into polymers that are thermoplastic elastomers.

Thus, in accordance with the presently most preferred embodiment of this invention, the polymer of configuration (iii) has the structure hydrogenated low vinyl polybutadiene-polystyrene-hydrogenated polyisoprene-polystyrene and the polymer of configuration (iv) has the structure hydrogenated polyisoprene-polystyrene hydrogenated-low vinyl polybutadiene-polystyrene.

These hydrogenated tetrablock polymers exhibit elastomeric properties without curing. Thus, these polymers are valuable at thermoplastic elastomers.

The ranges for the monomer weight percentages in the four blocks, as well as the ranges for the molecular weight of the polymer given above in connection with the non-hydrogenated polymer, apply to the hydrogenated polymer as well, taking into consideration, of course, the slight modification caused by the hydrogenation of the olefinic unsaturation in the molecule.

In accordance with a further embodiment of this invention, there is provided a process for producing the polymers of configurations (i) and (ii).

In one embodiment of this invention, this process comprises polymerizing 1,3-butadiene essentially in the absence of vinyl promoting agents in a reactor under polymerization conditions; adding to the reaction product of the first polymerization step under polymerization conditions, one monovinylarene monomer having 8-14 carbon atoms per molecule and polymerizing the said monovinylarene monomer as a block onto the polymerization product of the first step; adding to the reaction product of the first two steps under polymerization conditions, a block prepared from at least one conjugated diene having 4-12 carbon atoms per molecule in which the block has at least one side chain branch for every 10 carbon atoms of the polymeric backbone; and adding to the reaction product of the first three steps under polymerization conditions, the same or different said monovinylarene monomer described above and polymerizing the said monovinylarene monomer as a block onto the polymerization product of the first three steps. At the end of the process, the polymer is recovered in accordance with the procedures well known in the art.

The process just described can be carried out in the charge order used above or in the reverse charge order. However, if a polybutadiene having a vinyl content greater than 30 mol percent is used as block C, only the reverse charge order can be employed. This reverse charge order is necessary since the 1,2 polymerization inducing agent required for the formation of said vinyl-containing polybutadiene can be charged only after the formation of the low vinyl polybutadiene block B of the polymer. Thus, for example, in the preparation of polybutadiene (>30% vinyl)polymonovinylarene-low vinyl polybutadiene-polymonovinylarene, the reverse charge order must be used so that the 1,2-polymerization inducing agent is charged with the 1,3-butadiene for the formation of the last block of the tetrablock polymer and after the formation of the low vinyl polybutadiene block.

The polymerization time for each monomer charged in the process of this invention can vary broadly. The polymerization time for each monomer charge generally is in the range of a few minutes to 6 hours, preferably from 10 minutes to 2 hours.

The polymerization temperature can vary substantially. This polymerization temperature can be in the range of 15° C.-150° C. The preferable polymerization temperature is in the range of 40° C.-150° C.

The preferred class of polymerization initiators are the organomonolithium compounds of the formula RLi, wherein R is a hydrocarbyl radical having 1 to 20 carbon atoms selected from the group consisting of aliphatic, cycloaliphatic, and aromatic radicals and combinations thereof.

Some examples of suitable organomonolithium compounds are n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, 4-cyclohexylbutyllithium, and the like.

The amount of organomonolithium initiator employed frequently depends upon the desired molecular weight of the polymer. The amount is normally in the range of about 0.1 to about 100 milliequivalents per 100 grams of total monomers.

The polymerization in accordance with the invention is preferably carried out in the presence of a diluent. Suitable diluents are hydrocarbons which are not detrimental to the polymerization. Examples of suitable diluents or solvents are the paraffinic, cycloparaffinic, and aromatic hydrocarbons and mixtures thereof. Some examples of said diluents or solvents are n-hexane, n-heptane, 2,2,4-trimethylpentane, cyclohexane, benzene, toluene, and the xylenes and mixtures thereof.

As already indicated above, essentially no agent is employed during the polymerization of the 1,3-butadiene to form the block B, which would promote formation of vinyl unsaturation content within the polymer, i.e. would promote 1,2-polymerization. The degree of 1,2-polymerization occurring in the absence of vinyl promoting agents will normally be within the range of about 1 to about 10 mol % of the total polymerized 1,3-butadiene in block B.

Various materials are known to be detrimental to the initiator system employed in preparing polymers of this invention. Therefore, it is desirable that the reactants, diluents, and initiator employed in the process of this invention be free of these materials, as well as any other materials which may tend to interfere with the desired polymerization. Furthermore, it is desirable to remove air and moisture from the reaction vessel in which the polymerization is to be conducted.

An antioxidant is preferably added to the polymer solution prior to the recovery of the polymer. The addition of the antioxidant to the polymer solution has been found to be advantageous since its presence is a deterrent to polymer oxidation. An example of an antioxidant that can be added to the polymer solution is 2,6-di-t-butyl-4-methylphenol.

Upon completion of the polymerization of the last block of the tetrablock polymer, the polymerization mixture is treated to destroy carbon-lithium bonds and to isolate the polymer. A suitable method for accomplishing this result involves steam stripping the diluent from the polymer. In another suitable method, a material that will destroy carbon-lithium bonds such as an alcohol or a phenolic compound, is added to the mixture to destroy such carbon-lithium bonds and cause coagulation of the polymer. The polymer is then separated from the alcohol by filtration or any other suitable method.

The unsaturated polymers of said configuration (i) and (ii) above, in accordance with a still further embodiment of this invention, are converted into the hydrogenated polymers of said configuration (iii) and (iv) above exhibiting properties that make them useful as a thermoplastic elastomer by hydrogenation to remove from about 10 wt. percent to about 100 wt. percent of the olefinic unsaturation of the polymer without removing substantial amounts of aromatic unsaturation. The preferred percentage of olefinic unsaturation removed by hydrogenation ranges from about 70 wt. percent to about 100 wt. percent without removing substantial amounts of aromatic unsaturation.

The hydrogenation step of this embodiment of the process of the invention can be carried out after the polymerization has been terminated and the polymer has been isolated. It is presently preferred to carry out the hydrogenation to be described below immediately following the last polymerization step, i.e., either on the "living" polymer or on the polymer solution before coagulation.

The hydrogenation can be accomplished in the presence of a variety of catalysts of either heterogeneous or homogeneous type. Examples of suitable heterogeneous catalyst systems are nickel on keiselguhr, Raney nickel, copper-chromium oxide, molybdenum sulfide, and finely divided platinum or noble metals on suitable carriers. Homogeneous catalysts are preferred. Such homogeneous hydrogenation catalysts can be prepared by reducing a cobalt, nickel or iron carboxylate or alkoxide with an alkyl aluminum compound. An example of a preferred homogeneous catalyst is that formed through the reduction of nickel octoate (nickel $C_8$ carboxylate) by triethylaluminum. The polymer, preferably in solution in an inert solvent, is contacted with the catalyst under conditions which include temperatures in the range of about 0° to 250° C. and pressurization with hydrogen up to a total pressure of about 7000 kPa. The reaction time can vary from one minute to as long as 25 hours or more. Preferred conditions involve temperatures of 10° to 200° C., hydrogen pressures of 70 to 3500 kPa and reaction times of about 10 minutes to 10 hours. When treating the polymer in solution, the pressure is sufficiently high to maintain the reaction mixture substantially in the liquid phase.

Upon the effective completion of the hydrogenation reaction, the hydrogenated polymer can be isolated by conventional techniques. For example, the catalyst components can be converted to water soluble salts and washed from the polymer solution. An antioxidant can be added if desired followed by coagulation of the polymer and finally, removal of solvent traces under reduced pressure.

The novel hydrogenated polymers of this invention possess high green tensile strength, notably so at elevated temperatures, exhibit elastomeric properties without curing, and show improved environmental resistance or stability compared to unhydrogenated polymer. Thus, these polymers are valuable as thermoplastic elastomers.

Since these novel hydrogenated polymers require no curing, they are moldable and any scrap generated from such rubbers can be directly reclaimed and reused without requiring any degradative or other processing steps prior to reusing the scrap.

The novel hydrogenated polymers of this invention can be used in the fabrication of belts, hoses, and extruded and molded goods for diverse applications, including those in the building construction, automotive, medical and household article fields. Furthermore, they can have utility in the areas of adhesives and protective coatings.

The invention will still be more fully understood from the following examples, which are intended to illustrate, not to limit the scope of the invention.

EXAMPLE I

Monomers in quantities as shown in Recipe I were polymerized by sequential monomer addition under nitrogen in a ½ gallon capacity glass reactor vessel employing essentially anhydrous reactants and conditions. Two runs were carried out in which the relative quantities of monomers were different as shown in the following recipe. In each step the polymerization was continued until essentially complete.

The following recipe was used for the preparation of the tetrablock polymer having the structure low vinyl polybutadiene-polystyrene-polyisoprene-polystyrene.

| Recipe I | | |
|---|---|---|
| | Run 1 | Run 2 |
| Step I | | |
| 1,3-Butadiene, parts by weight | 24 | 42 |
| n-Butyllithium, mehm$^{(a)}$ | 1.8 | 1.8 |
| Cyclohexane, parts by weight | 779 | 779 |
| Tetrahydrofuran$^{(b)}$, parts by weight | 0.07 | 0.07 |
| Polymerization time, minutes | 30 | 30 |
| Polymerization temperature, °C. | 70 | 70 |
| Step II | | |
| Styrene, parts by weight | 24 | 18 |
| Polymerization time, minutes | 15 | 15 |
| Polymerization temperature, °C. | 70 | 70 |
| Step III | | |
| Isoprene, parts by weight | 48 | 42 |
| Polymerization time, minutes | 30 | 30 |

| -continued | | |
|---|---|---|
| Recipe I | | |
| | Run 1 | Run 2 |
| Polymerization temperature, °C. | 70 | 70 |
| Step IV | | |
| Styrene, parts by weight | 24 | 18 |
| Polymerization time, minutes | 15 | 15 |
| Polymerization temperature, °C. | 70 | 70 |

[a]mehm = milliequivalents of lithium per 100 grams of total monomers added in Steps I through IV.
[b]Tetrahydrofuran was added to activate the n-butyllithium catalyst. This level of tetrahydrofuran is not sufficiently high to induce 1,2 polymerization of 1,3-butadiene.

In each run following the fourth polymerization step (Step IV), one part by weight of 2,6-di-t-butyl-4-methylphenol per 100 parts by weight of polymer was added as an antioxidant. This antioxidant was added in a 50/50 volume ratio mixture of toluene and isopropyl alcohol. Thereafter, a sufficient quantity of isopropyl alcohol was added to coagulate the polymer. The coagulated polymer was collected by filtration and dried under reduced pressure.

EXAMPLE II

Monomers in quantities as shown in Recipe II were polymerized by sequential monomer addition under nitrogen in a ½ gallon capacity glass reactor vessel employing essentially anhydrous reactants and conditions. Two runs were carried out in which the relative quantities of monomers were different as shown in the following recipe. In each step the polymerization was continued until essentially complete.

The following recipe was used for the preparation of the tetrablock polymer having the structure polyisoprene-polystyrene-low vinyl polybutadiene-polystyrene.

| Recipe II | | |
|---|---|---|
| | Run 3 | Run 4 |
| Step I | | |
| Isoprene, parts by weight | 24 | 42 |
| n-Butyllithium, mehm[a] | 1.8 | 1.8 |
| Cyclohexane, parts by weight | 779 | 779 |
| Tetrahydrofuran[b], parts by weight | 0.07 | 0.07 |
| Polymerization time, minutes | 30 | 30 |
| Polymerization temperature, °C. | 70 | 70 |
| Step II | | |
| Styrene, parts by weight | 24 | 18 |
| Polymerization time, minutes | 15 | 15 |
| Polymerization temperature, °C. | 70 | 70 |
| Step III | | |
| 1,3-Butadiene, parts by weight | 48 | 42 |
| Polymerization time, minutes | 30 | 30 |
| Polymerization temperature, °C. | 70 | 70 |
| Step IV | | |
| Styrene, parts by weight | 24 | 18 |
| Polymerization time, minutes | 15 | 15 |
| Polymerization temperature, °C. | 70 | 70 |

[a]mehm = milliequivalents of lithium per 100 grams of total monomers added in Steps I through IV.
[b]Tetrahydrofuran was added to activate the n-butyllithium catalyst. This level of tetrahydrofuran is not sufficiently high to induce 1,2 polymerization of 1,3-butadiene.

In each run following the fourth polymerization step (Step IV), one part by weight of 2,6-di-t-butyl-4-methylphenol per 100 parts by weight of polymer was added as an antioxidant. This antioxidant was added in a 50/50 volume ratio mixture of toluene and isopropyl alcohol. Thereafter, a sufficient quantity of isopropyl alcohol was added to coagulate the polymer. The coagulated polymer was collected by filtration and dried under reduced pressure.

The physical properties of the polymers prepared in Examples I and II are shown in the following table:

Table II

| Physical Properties of Unhydrogenated Polymers | | | | |
|---|---|---|---|---|
| | Compositions as described in Recipes I and II | | | |
| | 1 | 2 | 3 | 4 |
| Inherent viscosity | 0.54 | 0.64 | 0.62 | 0.66 |
| Gel, % by weight | 0 | 0 | 0 | 0 |
| Molecular weight, Mw | 66,000 | 69,000 | 70,000 | 73,000 |
| Molecular weight, Mn | 56,000 | 57,000 | 57,000 | 59,000 |
| Styrene, % by weight | 40.5 | 30.5 | 40.5 | 30.5 |
| Block Styrene, % by weight | 38.9 | 28.3 | 38.7 | 27.6 |

The unhydrogenated polymers of Examples I and II were hydrogenated using a reduced nickel hydrogenation catalyst prepared by treating a 6 percent by weight solution of nickel octoate (nickel $C_8$ carboxylate) in cyclohexane with a solution of triethylaluminum in cyclohexane in quantities sufficient to give an aluminum/nickel molar ratio of 2.5/1. Fifty (50) grams of polymer were dissolved in 530 ml. of cyclohexane and subjected to hydrogenation in the presence of the reduced nickel hydrogenation catalyst in a ½ gallon capacity glass reactor. The reactor and its contents were purged thoroughly with nitrogen prior to the addition of sufficient reduced nickel solution to contain 0.25 part by weight nickel per one hundred parts by weight polymer. With continuous stirring, hydrogen was added at 345 KPa pressure. After a slight temperature surge to about 50° C., the temperature was regulated at 30° C. for the remainder of the two hour reaction period. At the end of the hydrogenation period the reaction solution was treated with water (50–100 ml) to deactivate the catalyst. Oxygen was then added and the mixture stirred at 70° C. until the mixture changed to a light gray or green color. The reaction mixture was washed with a solution of phosphoric acid and ammonium phosphate (¼ weight ratio) and then washed with water. Following the water wash, 2,6-di-t-butyl-4-methylphenol (0.5 parts by weight per hundred parts of polymer) was added in a 50/50 (by volume) toluene/isopropyl alcohol solution. The hydrogenated polymer was isolated by coagulation with isopropyl alcohol and dried under reduced pressure at 50° C.

The polymers were evaluated and the data determined for these hydrogenated polymers are shown in the following table.

Table III

| Physical Properties of Hydrogenated Polymers | | | | |
|---|---|---|---|---|
| | Hydrogenated derivates of the polymers from Table II | | | |
| | 1 | 2 | 3 | 4 |
| Melt Flow, 190° C./21.6 Kg[a] | 1.3 | 0.9 | 0.1 | 0.23 |
| Tensile (23° C.), psi[b] | 3,760 | 2,550 | 4,675 | 2,950 |
| Elongation (23° C.), %[b] | 780 | 780 | 490 | 640 |
| 300% Modulus, psi[b] | 950 | 1,000 | 1,350 | 775 |
| Tensile (50° C.), psi[b] | 1,210 | 1,040 | 3,630 | 1,780 |
| Elongation (50° C.), %[b] | 580 | 520 | 560 | 600 |
| Set at break, %[b] | 173 | 137 | 248 | 306 |
| Set at 300% elongation, %[b] | 57 | 57 | 167 | 155 |
| Hardness, Shore A[c] | 94 | 90 | 94 | 89 |
| Ozone Resistance (4"/3" lengths)[d] | | | | |
| 18 hours | 10/10[e] | 0/5[e] | 0/0[e] | 0/0[e] |
| 2 days | 10/10 | 0/10 | 0/0 | 0/0 |

Table III-continued

| Physical Properties of Hydrogenated Polymers | | | | |
|---|---|---|---|---|
| | Hydrogenated derivates of the polymers from Table II | | | |
| | 1 | 2 | 3 | 4 |
| 4 days | 10/X | 0/10 | 0/0 | 0/0 |

[a]Melt flow as g/10 min. ASTM-D-1238, condition F.
[b]ASTM-D-412-75
[c]ASTM-D-2240-75
[d]Strips of rubber of designated lengths are maintained in a bent-loop configuration in an ozone atmosphere for the designated time period.
[e]Ratings of a scale of 0 to 10 based on visual examination of specimens. 0 designates no visual change; 10 designates severe cracking; X designates failure of specimen.

From the data of Table III it can be seen that the four hydrogenated tetrablock polymers possess high green tensile strength at room temperature (23° C.) and 50° C.

In general, polymers having the structure "hydrogenated polyisoprene-polystyrene-hydrogenated low vinyl polybutadiene-polystyrene" (polymers 3 and 4 of Table III) have higher tensile strengths than do polymers having the structure "hydrogenated low vinyl polybutadiene-polystyrene-hydrogenated polyisoprene-polystyrene" (polymers 1 and 2 of Table III). Hydrogenated polymer 3, which has a longer low vinyl polybutadiene internal block than does hydrogenated polymer 4, has unusually high green tensile strength at both 50° C. and room temperature. In addition, the hydrogenated polymers 3 and 4 show a smaller percentage loss of green tensile strength as a result of increasing temperature (22% and 40% loss) than do the hydrogenated polymers 1 and 2. The extremely low loss of green tensile strength of hydrogenated polymer 3 is noteworthy and unexplainable at the present.

The difference in the ozone resistance of the two different types of polymers is striking. Hydrogenated polymers 3 and 4, which have internal blocks of low vinyl polybutadiene, have noticeably better ozone resistance than do hydrogenated polymers 1 and 2, which have internal blocks of polyisoprene.

Reasonable variations and modifications, which will become apparent to those skilled in the art, can be made in this invention without departing from the spirit and scope thereof.

What is claimed is:

1. A thermoplastic elastomer which comprises a tetrablock polymer having the general configuration

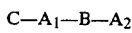

wherein
B is a low vinyl polybutadiene block wherein said low vinyl polybutadiene block has a vinyl content of from 1 to about 10 mol percent;
$A_1$ and $A_2$ can be the same or different blocks of a polymerized monovinylarene monomer having 8-14 carbon atoms per molecule;
C is a block of polymerized conjugated diene having 4-12 carbon atoms per molecule wherein said block of polymerized conjugated diene has on the average at least one side chain branch for every 10 carbon atoms of the polymeric backbone.

2. A composition of matter according to claim 1 wherein said low vinyl polybutadiene block B is 5-60 wt. % of the total polymer, each said conjugated diene block C is 5-80 wt. % of the total polymer, and said polymonovinylarene blocks $A_1$ and $A_2$ are individually 5-60 wt. % of the total polymer.

3. A composition of matter according to claim 1 wherein said low vinyl polybutadiene block B is 15-50 wt. % of the total polymer, each said conjugated diene block C is 15-45 wt. % of the total polymer, and said polymonovinylarene blocks $A_1$ and $A_2$ are individually 10-25 wt. % of the total polymer.

4. A composition of matter according to claim 1 wherein $A_1$ and $A_2$ are polymeric blocks formed from at least one monomer selected from the group consisting of styrene, α-methylstyrene, 3-methylstyrene, 4-n-propylstyrene, 1-vinylnaphthalene, 4-cyclohexylstyrene, p-tolylstyrene.

5. A composition of matter according to claim 4 wherein the selected monomer for $A_1$ and $A_2$ is styrene.

6. A composition of matter according to claim 1 wherein C is a polymeric block formed from at least one monomer selected from the group consisting of isoprene, 2,3-dimethyl-1,3-butadiene, piperylene, 3,-butyl-1,3-octadiene, 2-phenyl-1,3-butadiene, 1,3 butadiene.

7. A composition of matter according to claim 6 wherein the selected monomer for C is isoprene.

8. A composition of matter according to claim 1 wherein C is a polybutadiene having a vinyl content greater than 30 mol percent.

9. A composition of matter according to claim 2 wherein said polymer has a weight average molecular weight ranging from about 25,000 to about 1,000,000.

10. A composition of matter according to claim 3 wherein said polymer has a weight average molecular weight ranging from about 50,000 to about 200,000.

11. A thermoplastic elastomer which comprises a tetrablock polymer having the general configuration

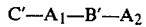

wherein
B' is a hydrogenated block of low vinyl polybutadiene wherein said hydrogenated block of low vinyl polybutadiene is produced from a non-hydrogenated low vinyl polybutadiene block having a vinyl content of from 1 to about 10 mol percent;
$A_1$ and $A_2$ can be the same or different polymerized blocks of a monovinylarene monomer having 8-14 carbon atoms per molecule;
C' is a hydrogenated block of polymerized conjugated diene having 4-12 carbon atoms per molecule wherein said hydrogenated block of polymerized conjugated diene has on the average at least one side chain branch for every 10 carbon atoms of the polymeric backbone.

12. A hydrogenated tetrablock polymer according to claim 11 wherein from about 10 percent to about 100 percent of the unsaturation in each of the blocks B' and C' has been reduced by hydrogenation.

13. A hydrogenated tetrablock polymer according to claim 12 wherein from about 70 percent to about 100 percent of the unsaturation in each of the blocks B' and C' has been reduced by hydrogenation.

14. A hydrogenated tetrablock polymer according to claim 11 wherein said hydrogenated low vinyl polybutadiene block B' is 5-60 wt. % of the total polymer, each said hydrogenated conjugated diene block C is 5-80 wt. % of the total polymer, and said polymonovinylarene blocks $A_1$ and $A_2$ are individually 5-60 wt. % of the total polymer.

15. A composition of matter according to claim 11 wherein said hydrogenated low vinyl polybutadiene block B' is 15–50 wt. % of the total polymer, each said hydrogenated conjugated diene block C' is 15–45 wt. % of the total polymer, and said polymonovinylarene blocks $A_1$ and $A_2$ are individually 10–25 wt. % of the total polymer.

16. A composition of matter according to claim 11 wherein $A_1$ and $A_2$ are polymeric blocks formed from at least one monomer selected from the group consisting of styrene, α-methylstyrene, 3-methylstyrene, 4-n-propylstyrene, 1-vinylnaphthalene, 4-cyclohexylstyrene, p-tolylstyrene.

17. A composition of matter according to claim 16 wherein the selected monomer is styrene.

18. A composition of matter according to claim 11 wherein C' is a hydrogenated polymeric block formed from at least one monomer selected from the group consisting of isoprene, 2,3-dimethyl-1,3-butadiene, piperylene, 3,-butyl-1,3-octadiene, 2-phenyl-1,3-butadiene, 1,3-butadiene.

19. A composition of matter according to claim 18 wherein the selected compound is isoprene.

20. A composition of matter according to claim 11 wherein C' is a polybutadiene having a vinyl content greater than 30 mol percent.

21. A composition of matter according to claim 14 wherein said hydrogenated polymer has a weight average molecular weight ranging from about 25,000 to about 1,000,000.

22. A composition of matter according to claim 15 wherein said hydrogenated polymer has a weight average molecular weight ranging from 50,000 to about 200,000.

* * * * *